United States Patent
Lecompere et al.

(10) Patent No.: US 12,343,931 B2
(45) Date of Patent: Jul. 1, 2025

(54) METHOD FOR MANUFACTURING AN OPTICAL COMPONENT WITH IMPROVED QUALITY SURFACE USING ADDITIVE MANUFACTURING

(71) Applicant: Essilor International, Charenton-le-Pont (FR)

(72) Inventors: Maxime Lecompere, Rambouillet (FR); Pierre Leite, Breuillet (FR); Jean-Marc Padiou, Champigny-sur-Marne (FR); Manuel Theodet, Quimper (FR)

(73) Assignee: Essilor International, Charenton-le-Pont (FR)

( * ) Notice: Subject to any disclaimer, the term of this patent is extended or adjusted under 35 U.S.C. 154(b) by 198 days.

(21) Appl. No.: 17/788,031

(22) PCT Filed: Dec. 23, 2020

(86) PCT No.: PCT/EP2020/087737
§ 371 (c)(1),
(2) Date: Jun. 22, 2022

(87) PCT Pub. No.: WO2021/130293
PCT Pub. Date: Jul. 1, 2021

(65) Prior Publication Data
US 2023/0041524 A1 Feb. 9, 2023

(30) Foreign Application Priority Data
Dec. 23, 2019 (EP) .................... 19306752

(51) Int. Cl.
*B29C 64/124* (2017.01)
*B29L 11/00* (2006.01)
*B33Y 10/00* (2015.01)

(52) U.S. Cl.
CPC ............ *B29C 64/124* (2017.08); *B33Y 10/00* (2014.12); *B29L 2011/00* (2013.01)

(58) Field of Classification Search
None
See application file for complete search history.

(56) References Cited

U.S. PATENT DOCUMENTS

2015/0276987 A1 * 10/2015 McKenzie ............. G02C 7/049
427/10
2016/0167299 A1 * 6/2016 Jallouli ............ B29D 11/00009
264/2.6
(Continued)

FOREIGN PATENT DOCUMENTS

CN  104044284  9/2014
CN  108136667  6/2018
(Continued)

OTHER PUBLICATIONS

International Search Report and Written Opinion issued in Corresponding Application No. PCT/EP2020/087737, dated Mar. 12, 2021.
(Continued)

*Primary Examiner* — Virak Nguon
(74) *Attorney, Agent, or Firm* — Norton Rose Fulbright US LLP (57) ABSTRACT

A method of manufacturing an optical component having at least one optical function, comprising: —manufacturing using an additive manufacturing process at least part of an optical element (40) by depositing a plurality of predetermined volume elements (14) of polymerizable material, a part of the optical element (40) being configured to provide at least a part of the optical function of an optical component, said additively manufacturing being performed such that the optical element (40) comprises an unfinished peripheric surface (42), said unfinished peripheric surface (42)
(Continued)

having a relief pattern (44) formed by traces of the additive manufacturing process and having at least one depression (18) with regard to another part of the peripheric surface (42), —coating said unfinished peripheric surface (42) with a layer (50) of coating liquid (46) configured to at least partially fill the at least one depression (18).

17 Claims, 2 Drawing Sheets

(56) References Cited

U.S. PATENT DOCUMENTS

| | | | |
|---|---|---|---|
| 2019/0009455 A1* | 1/2019 | Biskop | B33Y 10/00 |
| 2020/0030879 A1* | 1/2020 | Liang | H01S 3/0007 |

FOREIGN PATENT DOCUMENTS

| | | |
|---|---|---|
| JP | 2016024456 | 2/2016 |
| WO | WO 00/67981 | 11/2000 |
| WO | WO 2017/062857 | 4/2017 |
| WO | WO 2017/106341 | 6/2017 |
| WO | WO 2019/127453 | 7/2019 |

OTHER PUBLICATIONS

Office Action issued in corresponding Chinese Application No. 202080088726.9, dated Jan. 19, 2024.

* cited by examiner

METHOD FOR MANUFACTURING AN OPTICAL COMPONENT WITH IMPROVED QUALITY SURFACE USING ADDITIVE MANUFACTURING

CROSS-REFERENCE TO RELATED APPLICATIONS

This application is a national phase application under 35 U.S.C. § 371 of International Application No. PCT/EP2020/087737 filed 23 Dec. 2020, which claims priority to European Patent Application No. 19306752.7 filed 23 Dec. 2019. The entire contents of each of the above-referenced disclosures is specifically incorporated by reference herein without disclaimer.

The invention relates to the manufacturing of optical components, for example ophthalmic lenses.

More particularly, the invention relates to a method of manufacturing an ophthalmic component by additive manufacturing.

Methods for manufacturing ophthalmic components by additive manufacturing are well-known. An optical element is formed by the deposition of a plurality of predetermined volumes of material which can be layers of material or a plurality of voxels, i.e. elementary volumes of material, either formed within a same layer or formed by depositing droplets, each droplet being a voxel.

The deposition of said predetermined volumes of material induces a discretized or stepped pattern across the three dimensions, especially in slanted or curved areas of the optical element. This pattern does not allow to obtain a desired optical function when the optical element is an ophthalmic lens or a part thereof, due to a too high roughness, rendering this surface unacceptable for optical application.

A solution to this stepped pattern is for example disclosed in WO 2017/062857 A1 where a film or membrane is used to spread a resin onto an optical element obtained by additive manufacturing to smooth the peripheric surface of an optical component. However, the film or membrane may deform the optical element, or non-homogeneously spread the resin, if the film is too rigid or if the optical element is not yet fully solid. Conversely, if the film stretches too easily, it may not allow to reduce the stepped pattern to a fully satisfactory level, keeping traces of the stepped pattern.

A problem that the invention aims to solve is thus to provide an improved method allowing to manufacture an ophthalmic component with smoothed peripheric surface providing an accurate optical function.

To solve this problem, the invention provides a method of manufacturing an optical component having at least one optical function, comprising:
 manufacturing using an additive manufacturing process at least part of an optical element by aggregating successively a plurality of predetermined volume elements of polymerizable material, the part of the optical element being configured to provide at least a part of the optical function of an optical component, said additively manufacturing being performed such that the optical element comprises an unfinished surface, said unfinished surface having a relief pattern formed by traces of the additive manufacturing process and having at least one depression with regard to a mean curved surface of the surface,
 applying and spreading said unfinished surface with a layer of hardenable coating liquid configured to at least partially fill the at least one depression;
 hardening the layer of hardenable coating liquid.

The invention further provides a method for manufacturing an optical element, comprising providing an optical element with a surface having a stepped pattern such that the optical element is not entirely smooth, the method comprising:
 applying and spreading a hardenable coating liquid over the surface of the optical element so as to cover the stepped pattern of the optical element,
 hardening the hardenable coating liquid present on the surface;
 Wherein prior to applying the hardenable coating liquid, the surface having the stepped pattern is an unfinished surface.

The inventors noticed that providing said surface in an unfinished state before coating improves the process along two axis. First of all the spreading of the hardenable material over the unfinished surface is improved as compared to spreading over a finished or hardened surface due to improved wetting properties. Furthermore, this unfinished state allows to promote adhesion of the coating liquid to the surface while the coating hardens.

This improved wettability allows to use a coating liquid able to fill in the depressions formed by the relief pattern without forming air inclusions; furthermore the improved wettability enables to use a coating liquid with self-leveling properties that can smooth said depressions of the relief pattern. Both aspects enable to provide a continuous external surface. The external surface of the optical element is thus smoothed allowing to improve the ability of the optical element to meet the desired optical function.

Furthermore, the coating liquid hardens with the unfinished part of the unfinished surface thereby improving adhesion.

According to an embodiment of the manufacturing method, the unfinished surface is at least partially uncured before the coating step. Thus while hardening, the hardenable coating liquid may merge partially with material from the unfinished surface, thus reducing the appearance of interface between the two layers. It thus improves the ability of the optical element to provide the desired optical function.

Hence, the unfinished surface is partially but not fully cured before the coating step. This partial curing allows the surface to promote adhesion of the coating liquid.

According to an embodiment of the manufacturing method, the unfinished surface being formed by the external volume elements forming the optical element and said external volume elements having a non-null polymerization rate smaller or equal to having received 2 times a light having a curing surface energy representative of the Jacobs' energy.

According to an embodiment of the manufacturing method, the unfinished surface is an inhibited layer formed by extreme portion of the volume elements forming a superficial part of the optical element and in which the polymerization has been inhibited during the additive manufacturing process.

When the optical element is additively manufactured an inhibited layer is formed at external surface of the optical element. This inhibited layer is characterized by a gradient of conversion decreasing from the optical element below the inhibited layer to air. The formation of this layer comes from inhibition of the polymerization by at least one inhibitor species which is able to quench the initiation of the polymerization reaction or terminate the polymerization reaction. In case of a radical chain growth polymerization, dioxygen can play the role of inhibitor during the additive manufacturing. The reactive radicals created under irradiation are quenched by oxygen at the surface of the printed layer.

This inhibited state of an external layer which is generally undesirable according to standard processes, either avoided or removed by cleaning or fully cured in a final curing step, is used according to this embodiment of the disclosure as a benefit to promote wetting and adhesion and therefore enable to smooth the stepped pattern generated by the additive manufacturing.

According to an embodiment of the manufacturing method, the coating step comprises curing the layer of coating liquid deposited onto said unfinished surface.

This curing step allows to either fully cure the layer of coating liquid to finish the optical element or only partially cure the layer of coating liquid to promote adhesion of another layer of curing liquid. This curing may be configured to also fully cure or finish the unfinished surface below the coating liquid.

According to an embodiment of the manufacturing method, the predetermined inhibition of the surface is obtained by curing under an atmosphere comprising oxygen, in particular during the additive manufacturing of the unfinished surface.

According to an embodiment of the manufacturing method, a last layer of coating liquid present on the optical component is cured under an oxygen-free atmosphere.

According to an embodiment of the manufacturing method, the hardenable coating liquid is a polymerizable coating liquid.

According to an embodiment of the manufacturing method, the hardenable coating liquid comprises at least one type of initiator adapted for initiating a polymerization of the polymerizable material used for manufacturing the optical element.

According to an embodiment of the manufacturing method, the polymerizable material of the external predetermined volume elements forming the optical element and the hardenable coating liquid comprise the same monomer.

It allows to ease merging between the unfinished peripheric layer and the coating liquid. Furthermore, providing the unfinished peripheric layer and the coating liquid with the same material allows to have the same refractive index avoiding to limit undesirable optical effect.

In a particular embodiment, the hardenable coating material comprises, further to the polymerizable material of the external predetermined volume elements forming the optical element, additives adapted to improve rheological properties of the hardenable coating material, such as the spreading or leveling properties.

According to an embodiment of the manufacturing method, the absolute difference of refractive index between the polymerizable material of the external predetermined volume elements forming the optical element, at a hardened state, and the hardenable coating liquid, at a hardened state, is lower than 0.02, preferably lower or equal to 0.01.

According to an embodiment of the manufacturing method, it further comprises applying and spreading at least one additional layer of hardenable coating liquid onto the layer of hardenable coating liquid or onto another additional layer of hardenable coating liquid, and such that before applying and spreading the additional layer of hardenable coating liquid, the layer of hardenable coating liquid or said another additional layer of hardenable coating liquid is only partially cured.

In doing so, the method provides a plurality of coating layers for reducing the stepped pattern. The external surface of the optical element is therefore even more smoothed or with a better precision, with a similar total thickness of applied hardenable coating material as compared as smoothing using a single layer of coating material. Conversely, it allows a similar smoothness level as doing it using a single thicker coating level, using less total thickness of hardenable coating material. It also allows the process to be more flexible by choosing the smooth level of the external surface or other parameters.

According to a variant of said embodiment, before applying and spreading the additional layer of coating liquid, the layer of coating liquid or said another additional layer of coating liquid is at least partially uncured or has an inhibited extreme portion so as to promote adhesion of the additional layers of coating liquid thereto.

According to an embodiment of the manufacturing method, a different coating liquid can be used onto a previous coating layer. The said coating liquid used have adjusted rheological or mechanical behavior (higher or lower viscosity, higher or lower self-leveling ability).

According to an embodiment of the manufacturing method, the coating layer and the potential additional coating layer is such that the optical element is coated with a smoothing layer with a total thickness greater than a depth dimension of the depression, and/or greater than a mean thickness dimension of the predetermined volume element, preferably greater or equal to at least one and a half times such depth dimension.

This definition of the smoothing layer thickness allows to ensure that the depression is filled in with coating liquid and that the external surface of the optical element is smoothed. Furthermore, monitoring the thickness of the smoothing layer allows to have a layer with a thickness sufficient to smooth the external surface but not too high so as to optimize the amount of material used and ensure to keep the geometry of the desired optical element. Indeed, in case the optical element is destined to be an ophthalmic lens designed to be adapted in eyeglasses, the optical surface may be a complex surface, potentially with two or more zones with different optical powers. Accordingly, there is a tension between ensuring that the complexity of the optical surface of the lens is kept and smoothing the local reliefs and steps.

According to an embodiment of the manufacturing method, said predetermined inhibition of the extreme portion is obtained by curing the successive hardenable coating layers under an atmosphere comprising an inhibitor, such as dioxygen.

According to an embodiment of the manufacturing method, it comprises fully curing a final layer of hardenable coating liquid present on the optical component.

This final curing step allows to obtain a non-tacky or non-sticky surface for the optical element.

According to an embodiment of the manufacturing method, the unfinished surface of the optical element is not fully cleaned before the applying and spreading steps so that the surface comprises a layer or sublayer of curable liquid material before applying and spreading said unfinished surface with a layer of hardenable coating liquid According to an embodiment of the manufacturing method, the applying and spreading steps is performed by at least one among a dipping process, a spraying process, a spin coating process, an inkjet process and a polymer jetting.

All these processes allow to distribute the hardenable coating liquid all over the unfinished surface to help smoothing the external surface of the optical element.

According to an embodiment of the manufacturing method, the optical element comprises a plurality of layers formed by said plurality of volume elements and forming a curved profile, the relief pattern of said surface being a stepped pattern formed by edges of said layers.

The invention is described in more detail below by way of the figures that show several preferred embodiments of the invention.

Figure 1:
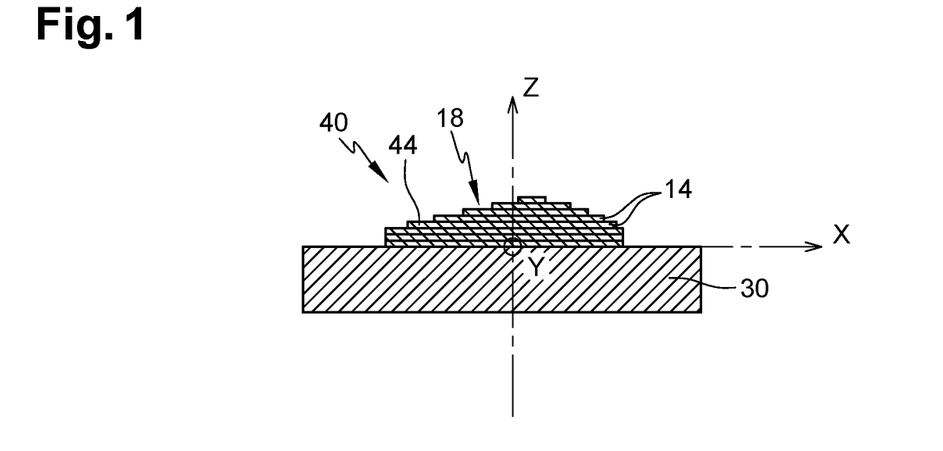
FIG. 1 schematically shows an optical element obtained by the deposition of predetermined volumes by additive manufacturing.

As shown on FIG. 1, an optical element 40 is obtained by additive manufacturing, i.e. by depositing a plurality of predetermined volume elements 14 which are juxtaposed and superposed to form a plurality of superposed layers of a material. The optical element 40 is a part of an optical component which may be an ophthalmic lens. The optical element 40 is for example formed onto a build support 30. Alternatively, the optical element 40 may be manufactured without any build support 30.

Said optical element 40 is manufactured with regard to a three-dimensional axis system comprising a first and a second surface axes X and Y defining a plane onto which the layers of volume elements 14 extends. The three-dimensional axis system also comprises a height axis Z relative to the thickness of the layers of volume elements 14.

Said predetermined volume elements 14 may be layers of material or a plurality of voxels, i.e. elementary volumes of material as defined by the additive manufacturing technology: droplets of material for ink-jetting, resolution of insolation in stereolithography, multiple voxels being irradiated together with a same layer of material, different layers of such groups of voxels being formed one above the other, size of raw material in fused deposition. Hence, said optical element 40 may comprise at least one among a plurality of layers and a plurality of voxels.

It will be noted that additive manufacturing here corresponds to a three-dimensional printing or stereolithography method, or even to a method of fused filament fabrication. Preferably, the additive manufacture is one among stereolithography (SLA), digital light processing stereolithography (DLP-SLA) or (photo)polymer jetting. An advantage of polymer jetting technology is that additive manufacturing machine can have multiple printing heads with various materials. Additive manufacturing technologies comprise processes which create objects by juxtaposition of volume elements according to a predetermined arrangement that can be defined in a CAD (Computer Aided Design) file.

Stereolithography (SLA) and digital light processing stereolithography (DLP-SLA) both work by focusing a light, mostly an ultraviolet light, onto a container of photocurable liquid resin in order to form solid layers that stack up to create a solid object. Regarding stereolithography (SLA), the liquid resin receives a selective exposure to light by a laser beam scanning the print area. Digital light processing stereolithography (DLP-SLA) uses a digital projector screen to project an image of each layer across the entire surface of the resin. As the projector is a digital screen, the image of each layer is composed of sensibly square pixels, resulting in a layer formed from small rectangular bricks called voxels (volume defined by the square pixel and the thickness of the layer).

As an alternative, the pixels may have other shapes, such as being hexagonal, rhombus or elongated depending on the technology used to form the images, for example the LCD or LED or DMD (micro-mirrors) pixels.

A polymer jetting technology uses an inkjet print head to jet droplets of curable liquid resin onto a build platform. The liquid resin is immediately cured by a curing unit, such as a heating source or a light source, and solidified in order to build layers, or the final optical element, set of droplets by set of droplets (and form the solid object).

In practice here, the additive manufacturing technology used is based on the projection of a light pattern on a curable material. The light of the pattern is for example from infrared light source or a micro-wave source or an ultraviolet light source. The curable material is for example a photopolymer/photocurable resin based on (meth)acrylate monomers/oligomers having sulfur atom in their backbone, and the optical element is manufactured when all volumes element were deposed and that polymerization of monomers is fully completed.

In practice, the photopolymerization process can be characterized by a monomer conversion rate Cv (or improperly "polymerization rate") of the curable material. The conversion rate Cv is linked to the physical state of matter of the curable material. Before being irradiated by the curable energy, mostly irradiation by light, the curable material is liquid. The conversion rate Cv is considered close to 0, notwithstanding a slight polymerization due to ageing of the curable material. Under the irradiation of the curable material by the curable surface energy, the curable material polymerizes and switches progressively from a liquid state to a solid state. The curable material is going through multiple states, especially an intermediate state, called "gel state", which corresponding conversion rate Cv depends of the composition of the curable material. The intermediate state corresponds to a matter state which is neither liquid nor solid but between them, in particular, not solid enough to be manipulate without damaging or deformation of the part, but with monomer having started to polymerize with each other, starting to form parts of a polymer network. The conversion rate Cv of the intermediate state may for example be between 10% and 80% for some acrylate monomers, or higher than 5% and/or lower than 67% for some others. The curable material is considered to be in a solid state for a conversion rate Cv generally higher than 70%. For some acrylate monomers, the curable material is considered to be in a solid state for a conversion rate Cv higher than 40%. Depending on the material, the curable material is considered to be in a solid state for conversion rates higher than a critical conversion rate which may be empirically determined between about 40% to about 100%.

A part of the optical element 40 is configured to provide at least a part of an optical function of the optical component.

It will be recalled that the optical function of a lens, of a system or of an optical element means the optical response of this lens or of this system or of this element, namely a function that defines any modification in the propagation and transmission of an optical beam through the lens, the system or the optical element concerned, whatever the angle of incidence of the incident optical beam and whatever the geometric extent of an input diopter illuminated by the incident optical beam. Said at least one optical function may be simple or complex.

More specifically, in the ophthalmic field, the optical function is defined as the distribution of wearer power and astigmatism characteristics and of higher-order aberrations associated with the lens, with the system or with the optical element for all the directions of gaze of a wearer of this lens, of this system or of this element. That of course assumes that the geometric positioning of the lens, of the system or of the optical element with respect to the eye of the wearer has been predetermined.

It will also be noted that the wearer power is a way of calculating and of adjusting the power of the ophthalmic lens, which differs from the focimetric power. Calculating the wearer power ensures that the power perceived by the wearer (i.e. the power of the beam of light that enters the eye) once the lens is positioned in the frame and worn by the wearer, corresponds to the prescribed power. In general, at any point on the lens, notably at the points at which distance vision and close vision are checked, for a varifocal lens, the power measured with a lensmeter differs from the wearer power. However, the wearer power at the optical center of a single-focus lens is generally close to the power observed with a lensmeter positioned at this point.

Depending on the desired optical function of the optical component, the front and back sides of the optical element 40 may be each planar or curved. The shape or predetermined profile of the optical element 40 is determined depending on the desired optical function of the optical component. A "curved" surface means that this surface defines a profile which has a curvature different from zero.

Figure 2:
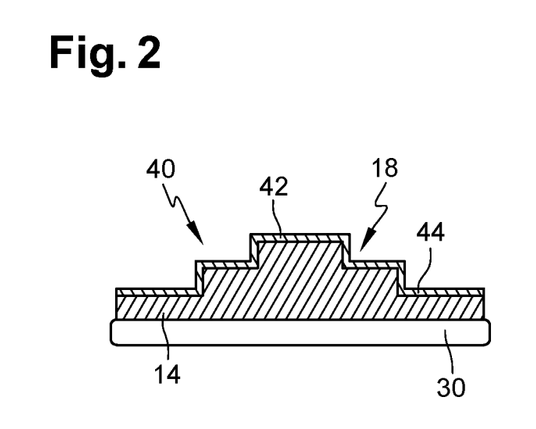
FIG. 2 schematically shows the optical element with an unfinished surface at the top of the optical element.

In FIGS. 1 and 2, the optical element 40 is partially manufactured. In other words, manufacturing of the optical element 40 is not completed so that the optical element 40 does not have its final shape or profile.

The optical element 40 comprises a surface 42. This surface 42 forms a relief pattern 44 on the optical element 40. The relief pattern 44 is formed by traces of the additive manufacturing process. This relief pattern 44 is in the form of a stepped pattern wherein each step is formed by an edge of a volume element 14. Depressions 18 are formed by the relief pattern 44 with regard to another part of the surface 42. Particularly, depressions 18 are formed between two end portions or two edges of successive volume elements 14.

As shown on FIG. 2, said surface 42 is a layer of material formed by the extreme portion or skin of the optical element 40. Hence, said surface 42 has a thickness different from zero. The surface 42 forms between 5% and 100% of the thickness of an additively manufactured layer. In other words, the surface 42 extends from the upper surface of a layer made by the volume elements 14 and has a thickness between 5% and 100% of the thickness of this layer. An additively manufactured layer generally has a thickness from 1 µm to 200 µm.

The additive manufacturing process is performed such that the surface 42 is unfinished.

By "unfinished", we mean that the layer having the unfinished surface 42 has, on at least part of its thickness, and at least on the unfinished surface, a conversion rate or polymerization rate lower than that desired for the finished optical element: e.g. it is at least partially uncured before the applying and spreading steps, and that on at least a part of its thickness a non-null conversion rate or polymerization rate. This part of its thickness can be addressed as a sublayer, as it is usually thinner than the usual layers used in the corresponding additive manufacturing process, or the further layers of hardenable material applied according to the present disclosure. In other words, an unfinished layer, or a layer with an unfinished surface, is at least partially but not fully polymerized. An unfinished layer, or a layer with an unfinished surface, is a non-fully solid layer in the meaning of Jacobs. As extreme illustrations, the layer having an unfinished surface may be wholly of a non solid gel material or, conversely, as a total opposite, be solid in the meaning of Jacobs for most of its thickness, with an uncleaned surface providing the surface with only a thin coating (between 5 to 50% of a layer's thickness) of totally uncured curable liquid material. Most applications of the invention can be in-between those two cases.

By "uncured" or "partially uncured" we mean that the surface 42 has at least an external layer or sublayer of curable material which is in a liquid state or in an intermediate state between liquid and solid, while having a non null conversion rate.

"Partially uncured" thus includes having an external liquid layer or sublayer on the surface, an external layer or sublayer which is in an intermediate state, or an external layer or sublayer which is solid enough to be manipulated while having a conversion rate, or polymerization rate, which can be increased substantially by a subsequent curing step e.g.: said material still containing un-polymerized monomer within.

In an embodiment of the surface 42 being partially uncured, the surface 42 of the optical element 40 is not fully cleaned before depositing the hardenable coating liquid 46. Not fully cleaning aims and enables to conserve/protect partially uncured layer or inhibited layer.

By "not fully cleaned", we mean that during the applying and spreading of the layer of hardenable coating liquid, the manufactured device already comprises a thin layer or sublayer of curable liquid material on its surface already present before applying the layer of hardenable coating liquid. In other words, immediately prior to the applying or spreading of the hardenable coating liquid 46, the surface of the optical element 40 is covered by said thin layer of liquid curable material.

In one embodiment, not fully curing maintains a liquid layer of the polymerizable material used for the additive manufacturing of the predetermined volume elements forming the optical element on top of said external polymerized or partially polymerized predetermined volume elements of the optical element. It may improve adhesion and merge the hardenable coating liquid with the inhibition layer. Not fully cleaning may include washing using a lower duration of solvent exposition, or only using draining which still leaves a thin layer of liquid on the manufactured device.

Figure 3:
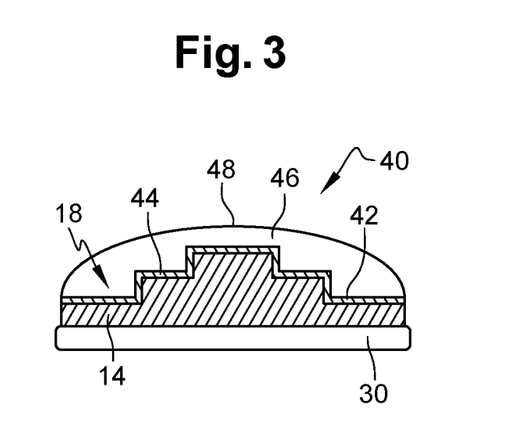
FIG. 3 schematically shows the optical element with a hardenable coating liquid coated onto the unfinished surface of the optical element.

The unfinished surface 42 is then coated with a layer of hardenable coating liquid 46 configured to at least partially fill the at least one depression 18. It has been observed that maintaining the surface 42 unfinished promotes wetting of the hardenable coating liquid 46 onto the surface 42. Improved wetting provided by the unfinished surface 42 allows the hardenable coating liquid able to stretch itself and to level itself to fill in the depressions 18 formed by the relief pattern 44. Furthermore, maintaining the surface 42 unfinished promotes the adhesion of the hardenable coating liquid 46 onto the surface 42. The hardenable coating liquid 46 merges with the material of the unfinished surface 42 thereby reducing the appearance of interface between the two layers. It improves significantly the ability of the optical element 40 to provide the desired optical function.

The hardenable coating liquid 46 deposited onto said unfinished surface 42 is then cured to harden the layer of hardenable coating liquid 46. The hardenable coating liquid 46 is either partially cured or fully cured depending on the number of hardenable coating liquid 46 which are intended to be deposited. Indeed, a plurality of layers of hardenable coating liquid 46 may be deposited, as shown on FIG. 4.

Figure 4:
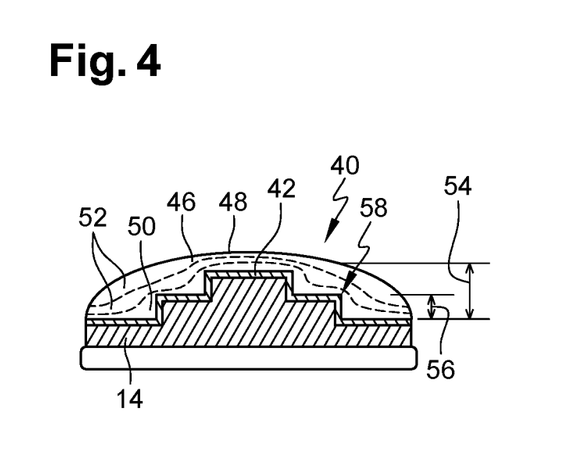
FIG. 4 schematically shows a plurality of coating layer applied onto the unfinished surface of the optical element.

When the hardenable coating liquid 46 is deposited using a plurality of layers the hardenable coating liquid 46 previously deposited corresponds to a first layer 50 of hardenable coating liquid 46. In this case, the first layer 50 is only partially cured to promote adhesion of another layer of hardenable coating liquid 46. In other words, the first layer 50 is maintained unfinished. An additional layer 52 of hardenable coating liquid 46 is deposited onto the first layer 50 of hardenable coating liquid 46. A plurality of additional layers 52 of hardenable coating liquid 46 may be deposited to obtain the final shape of the optical element 40. Each additional layer 52 is only partially cured, i.e. maintained in an unfinished state, to promote adhesion and wetting of another layer of hardenable coating liquid 46. The optical element 40 is then fully cured to harden the whole optical element 40 into a solid state, as shown on FIG. 5.

Figure 5:
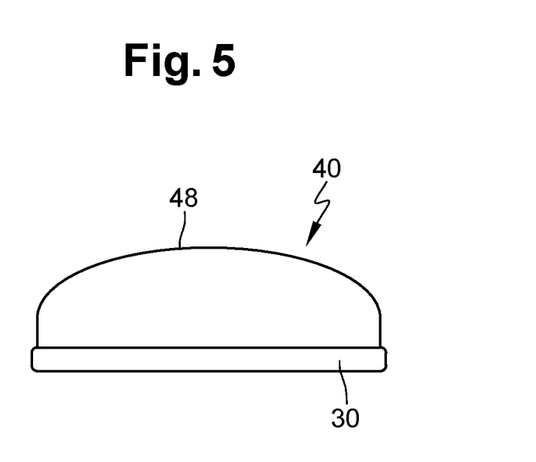
FIG. 5 schematically shows the optical element fully cured with a smoothed external surface.

When a single layer of hardenable coating liquid 46 is deposited onto the unfinished surface 42, the hardenable coating liquid 46 is then fully cured to harden the whole optical element 40 into a solid state, as shown on FIG. 5.

A continuous and smoothed external surface 48 can be thus obtained thereby improving the ability of the optical element 40 to meet the desired optical function. By "continuous and smoothed" surface we mean a surface without any or with a decreased relief pattern; e.g. with a relief pattern at least smaller than 1 µm, or even smaller than 500 nm. In particular the relief pattern is such that H<KT² with H being the amplitude of the height variation from the targeted surface, and T the period of the wave formed by the relief pattern and K a constant depending on refractive index, and manufacturing tolerances. In particular it is meant that H and T have to respect the equation below:

$$H \le \frac{\Delta P * T^2}{(n-1) * 2\pi^2}$$

With H=amplitude of the height variation from the targeted surface in µm

Delta P=industrial tolerance, it is smaller than 0.12 Dioptry, or 0.06

Dioptry, or even 0.02 Dioptry depending on targeted quality of the optical lens.

T=period of the relief pattern, or «wavelength», in millimeter.

n=refraction index of the material

As an example, for a hardened coating material of index 1.5, one of the lowest index used for eyeglasses lenses, and the highest industrial tolerance, one may find in the table 1 below the maximum height of the relief patterns depending on the wavelength of said relief pattern for the surface to be considered continuous and smoothed.

TABLE 1

| T (mm) | H (µm) |
|---|---|
| 1 | 0.012 |
| 2 | 0.049 |
| 3 | 0.109 |
| 4 | 0.195 |
| 5 | 0.304 |
| 6 | 0.438 |
| 7 | 0.596 |
| 8 | 0.778 |
| 9 | 0.985 |
| 10 | 1.216 |

It is to be noted that usually the term «roughness» is determined for relief patterns having a wavelength smaller than 1 mm. An optical surface for eyeglasses is considered as smooth if the Ra (arithmetic mean of the amplitude) is smaller or equal to 10 nm.

This multi layering of the hardenable coating liquid 46 can be configured to create gradient of thermo-mechanical or optical properties. As an example, the material may be chosen so that scratch durability is improved or post coating polishing is rendered easier. This may be accomplished by changing the curable material itself of the hardenable coating liquid for one or more layers or an increased percentage of hardener or of colloids may be added to the curable material. Furthermore, softening of the material may be chosen for better impact resistance of the optical element 40. The plurality of layers may form band filtering for cutting predetermined wavelengths, as harmful blue light.

The surface 42 may be maintained unfinished using a first or a second embodiments. The same embodiments may be used to make the layers of hardenable coating liquid 46 unfinished.

According to the first embodiment, the unfinished surface 42 is an inhibited layer or sublayer of the externals layers of hardened material. In other words, polymerization of the surface 42 has been inhibited during the additive manufacturing process to maintain it unfinished.

After printing an object using additive manufacturing, an inhibited layer is formed at the periphery of the object and is characterized by a gradient of conversion decreasing from part to air. This inhibited layer or sublayer is formed from inhibition of the polymerization by dioxygen during the printing. Hence, the layer is printed or cured under dioxygen or normal atmosphere to maintain the polymerization inhibition phenomenon. The reactive radicals created under irradiation are quenched by dioxygen at the surface of the printed layer. In coating field, strong efforts are deployed to avoid the formation of this inhibited layer during/after curing. In this first embodiment, the surface 42 is voluntary formed as an inhibited layer or sublayer to promote the adhesion and spreading of another layer of material and reduce the appearance of interfaces between the layers.

When applying and spreading the surface 42, the inhibited layer is replenished of initiator by diffusion. These initiators are protected from dioxygen. When the hardenable coating liquid 46 is polymerized or cured, the previous inhibited layer or sublayer (the surface 42 or a layer of hardenable coating liquid 46) also polymerizes and a new inhibited layer is formed at the top of the hardenable coating liquid 46. This configuration wherein a new coating layer is deposited onto an inhibited layer or sublayer and then partially cured allows the new coating layer to merge with the previous inhibited layer and thus with the volume elements 14 already manufactured.

In this first embodiment, the last layer of hardenable coating liquid 46 of the optical element 40 is deposited under an oxygen-free atmosphere so as to finish this last layer. Once last layer is applied, the staircase is smoothed, the optical element 40 is placed inside oven under inert atmosphere (nitrogen for example) to avoid oxygen inhibition and to cure definitely the optical element 40. This last layer of hardenable coating liquid 46 is the first layer 50 when a single layer is deposited and an additional layer 52 when a plurality of coating layers are deposited onto the optical element 40.

According to the second embodiment, the surface 42 is made unfinished by adjusting the total curing energy (or light dose) provided to the predetermined volume elements forming the surface 42 during the additive manufacturing process. By "last curing energy" we mean the last irradiation provided by a light source before the deposition of layer of hardenable coating liquid 46.

Accordingly, during the additive manufacturing process, the curing energy received by the curable material of the surface 42 is defined to be not enough to completely harden the curable material thereby maintaining it uncured. Hence, the surface 42 is provided only with a predetermined light dose allowing to start the curing process but without reaching a light dose value enabling to fully cure the surface 42.

Adjusting the light dose provided to the curable material allows to control the polymerization rate (or conversion rate) of the curable material. Indeed, the conversion rates characterizing the intermediate state and the solid state depend on a curing surface energy E (or light dose) derived from the light source, on the absorption properties of the curable material, and on the efficiency of initiator to polymerize the curable material.

Figure 6:
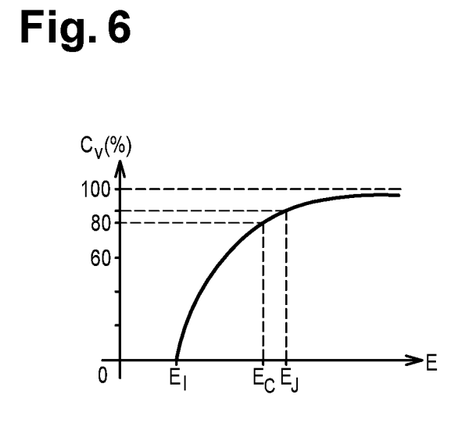
FIG. 6 shows a conversion rate of a curable material as a function of the energy provided thereto.

FIG. 6 shows a graph of the conversion rate Cv (in %) as a function of the curing surface energy E which irradiates the curable material.

The light dose provided to the surface 42 in the current embodiment is adjusted to be lower than or equal to the Jacob energy Ej. This enables that the volumes elements forming the surface are partially uncured, i.e. at least part of each of the volume elements forming the surface is uncured. In a variant, the light dose provided to the surface 42 in the current embodiment is adjusted to be lower than or equal to the critical Jacobs energy Ec, for example greater than 0.3*Ec. This enables that the volumes elements forming the surface are uncured: i.e. in an intermediate state, while still having initiated a polymerization. For example, if the volumes elements are voxels, e.g. formed by depositing a droplet of material by inkjet or voxels formed by irradiating pixels on a layer of liquid material, the voxels forming the surface are in an intermediate state.

Figure 8:
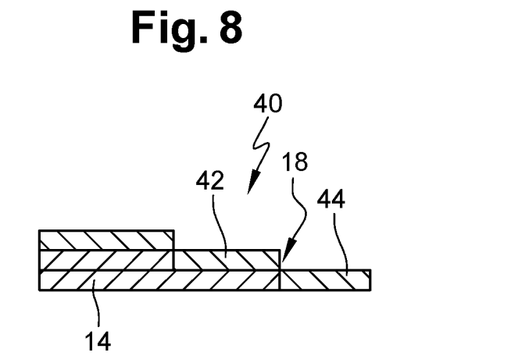
FIG. 8 schematically shows a detailed view of the surface of the optical element.

It is to be noted that if the curable material forming the surface 42 received a light dose higher than the Jacobs' energy but lower than 3 times, a light dose corresponding to a curing surface energy representative of the Jacobs' energy (Ej), while still being lower than the energy needed to reach a complete conversion, the predetermined volume elements of the surface can be in a unfinished state within the meaning of the disclosure while not being "partially uncured" within the meaning of the disclosure. It is expected that if the provided energy is smaller than 2 times Ej, the surface will be in an unfinished state. FIG. 8 shows the surface 42 forming the unfinished layer for which the light dose has been set lower than or equal to the Jacob energy Ej.

The Jacobs energy Ej corresponds to the minimum curing surface energy to provide, for a given curable material, of a given thickness, to harden the whole given thickness into a state solid enough to be measured according to the methodology of Jacobs. The Jacobs energy Ej is obtained from Jacobs' equation as follows:

$$Ej=Ec*\exp(th/Dp)$$

where "th" is the thickness of the optical element 40, "Dp" is the light depth penetration value of the curing surface energy within the curable material, and "Ec" is the critical Jacobs energy defined for the curable material.

In the case of acrylate monomers cured by radical chain growth polymerization process, the corresponding conversion rate Cv for a material considered as solid, ie: having received at least the Jacobs' energy, is usually around 60% to 80%. According to this conversion rate Cv, the monomer conversion is enough to have the polymerized material in a solid state, even if an increased conversion is needed for the manufactured device to have adequate mechanical properties. Accordingly, one may consider for acrylates monomers that the advantages of some embodiments of the disclosure may apply for conversion rates smaller than 80% or 60%.

Figure 7:
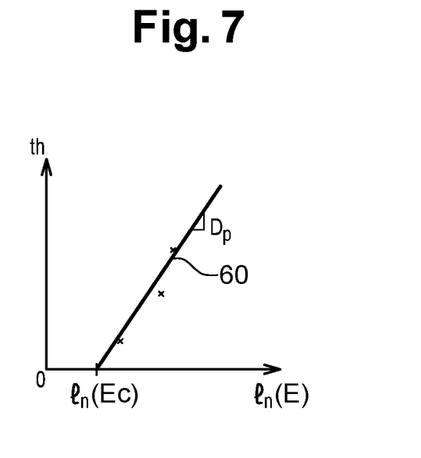
FIG. 7 shows the expected thickness of layer as a function of the natural logarithm of the energy provided thereto.

The light depth penetration value Dp and the critical Jacobs energy Ec are obtained from a working curve 60 derived from Jacobs' experiments, as shown on FIG. 7. The experiment consists in irradiating a curable material (here a resin) with a set of known curing surface energies, forming either multiple samples having been irradiated with different curing surface energies, or potentially one sample comprising different regions having been irradiated with different curing surface energies, and measuring the corresponding polymerized thicknesses of measurably solid material for each sample or region of sample. The working curve 60 is a semi-logarithmic plot of the measured thickness of measurably solid polymerized material as a function of the natural logarithm (ln) of the curing surface energy E.

Applying and spreading of the surface 42 may be performed by technologies usual in the ophthalmic field, such as in particular a dipping process, a spraying process, a spin coating process, an inkjet process or a polymer jetting. To avoid risks of damage during transportation and dust inclusion. Coating devices may be implemented in an additive manufacturing machine (printing machine or DLP-SLA machine) or a dedicated unit connected to the printing machine.

A controlling process may be implemented in the method according to the invention. A surface measuring device may be used to define appropriate coating conditions. This is particularly useful when using inkjet/Polymer Jetting technology where the amount of dispensed resin can be calculated depending the (X,Y) position. This surface measuring device is preferably a non-contact measuring device.

The surface measuring device is for example an optical measuring device using phase deflectometry technology. In this case, it is preferred to use a light wavelength that doesn't activate the polymerization of the resin, particularly if ultraviolet light. Alternatively, the surface measuring device uses for example an interferometry process. It is preferred to use a stitching device in combination to this interferometry process. Those processes may either work on measurement by reflection or on measurement by transmission and deflection of light. In reflection it is for example possible to work using either a non-transmitted wavelength so as to avoid secondary reflections from the other surface of the optical component, or from an interface between the coating and the un-finished surface. Preferentially the wavelength is chosen so as to not be one that reacts with the photoinitiators present within material of the unfinished surface.

The manufacturing method may be performed using a close loop process to better monitor the characteristics of the final optical element 40. An example of such a control close loop process is shown on FIG. 9.

Figure 9:
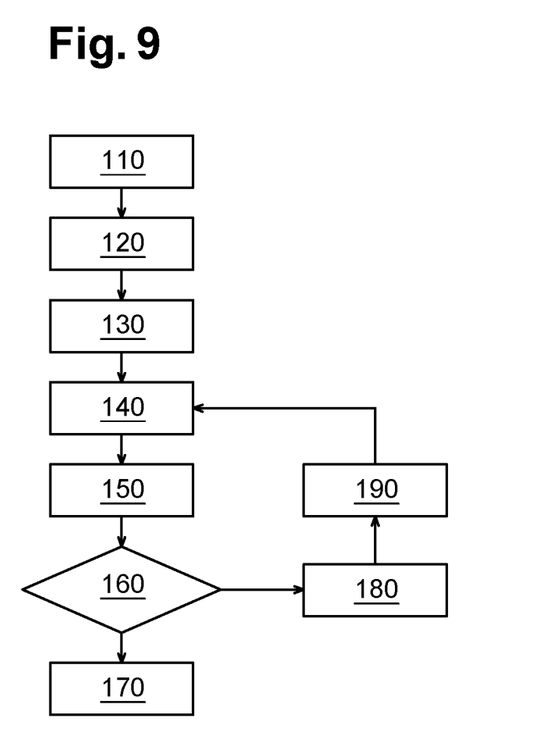
FIG. 9 shows a flowchart of an embodiment of the manufacturing method for controlling acceptance requirements.

The unfinished surface 42 is printed 100 and then measured 110 by a surface measuring device. Characteristics of a first coating layer are determined 120 depending on the measurement performed on the surface 42. These characteristics preferably comprise at least the thickness of the first coating layer. Furthermore, the frequency or amplitude of the waviness or roughness and a mean amplitude of roughness may be taken into account to determine a needed rheological property of the first coating layer: thickness, viscosity, surface tension . . . etc. The first coating layer is then deposited 130 onto the surface 42 and measured 140 by the surface measuring device.

These measurements performed on the first coating layer are compared 150 to acceptance requirements, for example a surface quality of the optical element 40 or the thickness of the first coating layer. If the optical element 40 is acceptable, the controlling process is completed and the first coating surface is fully cured 160 under inert (oxygen-free) atmosphere. If the optical element 40 is not acceptable, the first coating layer is cured 170 under oxygen atmosphere. An additional coating layer is calculated 180 and then deposited 190 onto the first coating layer. The additional coating layer is also measured 140. Another comparison 150 is performed to determine if the optical element 40 is acceptable with this additional coating layer. A close-loop is thus formed to determine the characteristics and the number of additional coating layer to make the optical element 40 acceptable.

In the example above, the surface measurement is performed before curing. Alternatively, the surface measurement may be performed after the curing under oxygenated atmosphere.

The hardenable coating liquid 46 is a curable material. In an embodiment, the curable material of the hardenable coating liquid 46 is substantially the same as the curable material of the volume elements 14. Indeed, using the same material for the hardenable coating liquid 46 and the volume elements 14 promotes spreading, adhesion and merging of the hardenable coating liquid 46 onto the material of the unfinished surface of the optical element. Furthermore, using the same material allows to have layers with the same refractive index. Here, substantially means that the hardenable coating material would comprises the monomer(s) of the material used to form the predetermined volume elements of the optical element in sensibly the same proportions, while possibly having different additives or concentrations of additives or solvents adapted to modify the rheological properties of the hardenable coating material, such as the spreading or leveling properties. By exception is to be noted that some additives may be in the form of monomers, for less than 15% in mass of the monomers.

In an embodiment where multiple layers of hardenable hardenable coating liquid are spread successively on the surface of the optical element, the curable material of the hardenable coating liquid 46 is the substantially the same as the curable material of the volume elements 14 for all layers. Alternatively, it may be different for some of the layers, while generally the first layer applied, which is in direct contact with the unfinished surface, would be with the substantially the same material as the curable material of the volume elements.

The material of the hardenable coating liquid 46 preferably comprises at least one type of initiator adapted for initiating a polymerization of the polymerizable or curable material of the volume element 14.

The coating parameters should be adapted regarding factors as the coating technology, the resin rheological behavior, the height of the volume elements 14, the concavity and the curvature of the surface, the area to cover, etc.

It is to be noted that in order to have a self-leveling coating, it is preferable to have the highest possible surface tension. To obtain a good wetting between a solid surface and a coating liquid, it is preferred to have the lowest contact angle A, below 90°. The contact angle A is linked to the surface energy of the solid Ess, the surface energy between the solid and the liquid Esl and the surface tension of the liquid T by the following equation:

$$Ess = T\cos(A) + Esl$$

$$\text{Thus, } A = ar\cos([Ess-Esl]/T)$$

Thus, increasing the surface tension T increases the contact angle and diminishes wettabilty.

Conversely, increasing Ess or decreasing Esl decreases the contact angle and increase wettability.

Thus, one wants a low surface tension in order to have a good wetting of the coating on the surface and a high surface tension in order to have good self leveling properties.

The inventors identified that having an unfinished material forming the surface decreases the surface energy between the hardenable coating liquid and the surface Esl and increases the surface energy of the surface Ess. Accordingly, using an unfinished surface enables to improve the wetting properties of the surface with regard to the hardenable coating liquid. This improves then the spreading of the hardenable coating liquid on the surface and facilitates the filling of any depression or holes within the surface.

Further, decreasing the surface energy between the hardenable coating liquid and the surface Ess and increasing Esl enables to have a higher surface tension of the hardenable coating liquid while still maintaining a low contact angle. Thus it is possible to use a material with improved self-leveling properties while still enabling a good spreading of the hardenable coating material on the surface.

Further, it is to be noted that when using an unfinished surface which is partially liquid or uncured within the meaning of the disclosure, the wettability mechanism transitions from a liquid on solid wettability to a liquid on liquid miscibility. The miscibility mechanism isn't driven primarily by the surface tension of the coating liquid, but by solubility parameters of both liquids, such as polarities, dispersion, molecular weight, hydrogen bounds, van der Waals bounds . . . Etc. Accordingly, the method of the disclosure, in the case of uncured or partially liquid unfinished surface, enables to have high wetting properties with a low influence of the surface tension of the hardenable coating liquid. It is thus possible to use an hardenable coating liquid with a higher surface tension than in a liquid on solid wettability. This phenomenon is increased if the material of the coating liquid is close chemically to the material of the unfinished surface.

The rheological behavior of the hardenable coating liquid 46 may be changed by rheological additives for better filling and/or leveling/stretching. The following additives may be used: surface additives, air release additives (when solvents are used), adhesion promoters, coupling agents, wetting and dispersing additives (in case of filled coating), viscosity modifiers which may sometimes be monomers, and, more generally, rheological agents modifiers.

These rheological additives can be mixed in the curable material or added during the deposition.

The rheological behavior and coating parameters can be adapted for each hardenable coating layer. For example, the filing and leveling ability may be increased for the additional coating layers 52 only. This ability may be then progressively adapted for each additional layer to enhance the leveling behavior.

Thickness of the coating layers may be different for each layer. The total coating thickness is preferably about at least the height of the depressions 18 (stair steps), e.g. between 1 and 200 µm, depending on the additive manufacturing technology employed.

The hardenable coating liquid 46, as a single layer or a plurality of layers, is such that the surface 42 is coated with a smoothing layer with a coating thickness 54 greater than the depth dimension 56 of the depression 18. The thickness of the layer and a depth dimension 56 of the depression 18 are defined along the thickness axis Z, as shown on FIG. 4. The depth dimension of a depression 18 refers to the length along the thickness axis Z between upper surfaces of two successive layers of volume elements 18. The coating thickness 54 is preferably considered along the thickness axis Z at a point located on a hollow between two layers or volume elements 14 on the surface. Alternatively, the coating thickness 54 may be defined by the shortest distance between a hollow between two layers or volume elements of the surface 42 of the optical element 40 and the external surface of the hardenable coating layer and/or the external surface 48 of the optical element. This external surface 48 corresponds to the external surface 48 of the optical element 40 when fully cured, including curing of the at least one hardenable coating layer.

Alternatively or in combination, the coating thickness 54 is greater than a mean thickness dimension of the predetermined volume element 14. The mean thickness may be calculated by calculating a mean of the thickness along the Z axis for each of the layers and/or voxels used to manufacture the optical element. Preferably, the coating thickness 54 is greater or equal to at least one and a half times such depth dimension 56 or mean thickness dimension.

The invention claimed is:

1. A method of manufacturing an optical component having at least one optical function, comprising:
   manufacturing using an additive manufacturing process at least part of an optical element by aggregating successively a plurality of predetermined volume elements of polymerizable material, a part of the optical element being configured to provide at least a part of the optical function of an optical component, said additively manufacturing being performed such that the optical element comprises an unfinished surface, said unfinished surface having a relief pattern formed by traces of the additive manufacturing process and having at least one depression with regard to a mean curved surface of the surface;
   applying and spreading said unfinished surface with a layer of hardenable coating liquid configured to at least partially fill the at least one depression; and
   hardening the layer of hardenable coating liquid;
   wherein the method further comprises applying and spreading at least one additional layer of hardenable coating liquid onto the layer of hardenable coating liquid or onto another additional layer of hardenable coating liquid, and such that before applying and spreading the additional layer of hardenable coating liquid, the layer of hardenable coating liquid or said another additional layer of hardenable coating liquid is only partially cured.

2. The method according to claim 1, wherein the unfinished surface is at least partially uncured before the applying and spreading step.

3. The method according to claim 2, wherein the unfinished surface is formed by external volume elements forming the optical element and said external volume elements have a non-null polymerization rate smaller or equal to a polymerization rate that corresponds to the external volume elements having received a light having a curing surface energy that is double the Jacobs' energy (Ej), where $Ej=Ec*exp(th/Dp)$.

4. The method according to claim 2, wherein the unfinished surface is an inhibited layer formed by an outer portion of the volume elements forming a superficial part of the optical element and in which the polymerization has been inhibited during the additive manufacturing process.

5. The method according to claim 1, wherein the hardenable coating liquid is a polymerizable coating liquid.

6. The method according to claim 5, wherein the hardenable coating liquid comprises at least one type of initiator adapted for initiating a polymerization of the polymerizable material used for manufacturing the optical element.

7. The method according to claim 1, wherein the polymerizable material of external predetermined volume elements forming the optical element and the hardenable coating liquid comprise the same monomer.

8. The method according to claim 1, wherein an absolute difference of refractive index between the polymerizable material of external predetermined volume elements forming the optical element, at a hardened state, and the hardenable coating liquid, at a hardened state, is lower than 0.02.

9. The method according to claim 8, wherein the absolute difference of refractive index between the polymerizable material of the external predetermined volume elements forming the optical element, at a hardened state, and the hardenable coating liquid, at a hardened state, is lower than 0.01.

10. The method according to claim 1, further comprising applying and spreading at least one additional layer of hardenable coating liquid onto the layer of hardenable coating liquid or onto another additional layer of hardenable coating liquid, and such that before applying and spreading the additional layer of hardenable coating liquid, the layer of hardenable coating liquid or said another additional layer of hardenable coating liquid is at least partially uncured or has an inhibited extreme portion or sublayer so as to promote adhesion of the additional layer of hardenable coating liquid thereto.

11. The method according to claim 10, wherein the layer of hardenable coating liquid and the potential additional layer of hardenable coating liquid are such that the optical element is coated with a smoothing layer with a total thickness greater than a depth dimension of the depression, and/or greater than a mean thickness dimension of the predetermined volume element.

12. The method according to claim 11, wherein the layer of hardenable coating liquid and the potential additional layer of hardenable coating liquid are such that the optical element is coated with a smoothing layer with a total thickness greater or equal to at least one and a half times such depth dimension.

13. The method according to claim 11, wherein the thickness of the smoothing layer is monitored to ensure correct geometry of the layer of hardenable coating liquid.

14. The method according to claim 1, wherein the unfinished surface of the optical element is not fully cleaned before the applying and spreading step so that the surface comprises a layer or sublayer of curable liquid material before applying and spreading said unfinished surface with a layer of hardenable coating liquid.

15. The method according to claim 1, wherein the applying and spreading steps are performed by at least one among a dipping process, a spraying process, a spin coating process, an inkjet process and a polymer jetting.

16. The method according to claim 1, wherein the optical element comprises a plurality of layers formed by said plurality of volume elements and forming a curved profile, the relief pattern of said surface being a stepped pattern formed by edges of said layers.

17. A method for manufacturing an optical element, comprising providing an optical element with a surface having a stepped pattern such that the optical element is not entirely smooth, the method comprising:

applying and spreading a layer of hardenable coating liquid over the surface of the optical element so as to cover the stepped pattern of the optical element; and hardening the layer of hardenable coating liquid present on the surface;

wherein prior to applying the hardenable coating liquid, the surface having the stepped pattern is an unfinished surface;

wherein the method further comprises applying and spreading at least one additional layer of hardenable coating liquid onto the layer of hardenable coating liquid or onto another additional layer of hardenable coating liquid, such that before applying and spreading the additional layer of hardenable coating liquid, the layer of hardenable coating liquid or said another additional layer of hardenable coating liquid is only partially cured.

* * * * *